United States Patent
Steinberg et al.

[11] Patent Number: 5,874,991
[45] Date of Patent: Feb. 23, 1999

[54] APPARATUS FOR THE CREATION OF VIDEO TEST SIGNALS

[75] Inventors: Victor Steinberg, Petersfield; Jonathan Fall, Weybridge; Chi Long Tsang, Petersfield, all of Great Britain

[73] Assignee: Snell & Wilcox Limited, Petersfield, United Kingdom

[21] Appl. No.: 537,738

[22] PCT Filed: Sep. 16, 1994

[86] PCT No.: PCT/GB94/02026

§ 371 Date: Jan. 11, 1996

§ 102(e) Date: Jan. 11, 1996

[87] PCT Pub. No.: WO95/24101

PCT Pub. Date: Sep. 8, 1995

[30] Foreign Application Priority Data

Mar. 2, 1994 [GB] United Kingdom ............... 9403983

[51] Int. Cl.⁶ .................................................. H04N 17/00
[52] U.S. Cl. ......................... 348/181; 348/586; 348/177
[58] Field of Search ................................ 348/419, 722, 348/177, 180, 181, 184, 185, 714, 715, 458, 449, 586, 178, 186; 345/114, 122, 134, 121, 473; H04N 17/00

[56] References Cited

U.S. PATENT DOCUMENTS

| | | | |
|---|---|---|---|
| 4,364,080 | 12/1982 | Vidovic | 348/185 |
| 4,554,663 | 11/1985 | Pham van Cang | 348/181 |
| 4,635,046 | 1/1987 | Morgan | 348/181 |
| 4,908,700 | 3/1990 | Ishii et al. | 348/169 |
| 4,953,017 | 8/1990 | Ivey et al. | 348/185 |
| 5,055,928 | 10/1991 | Klingelhofer | 358/139 |
| 5,109,425 | 4/1992 | Lawton | 382/107 |
| 5,166,791 | 11/1992 | Crawford | 348/563 |
| 5,398,072 | 3/1995 | Auld | 348/715 |
| 5,412,773 | 5/1995 | Carlucci et al. | 348/552 |
| 5,587,723 | 12/1996 | Otake et al. | 345/114 |
| 5,649,032 | 7/1997 | Burt et al. | 348/588 |

FOREIGN PATENT DOCUMENTS

| | | | |
|---|---|---|---|
| 0 089 873 | 9/1983 | European Pat. Off. | H04N 9/62 |
| 0 122 124 | 10/1984 | European Pat. Off. | H04N 9/62 |
| 0 501 732 | 9/1992 | European Pat. Off. | H04N 17/00 |
| 0 562 715 | 9/1993 | European Pat. Off. | H04N 5/262 |
| 3704289 | 8/1988 | Germany | H04N 9/75 |
| WO 93/20659 | 3/1993 | WIPO | H04N 17/02 |

OTHER PUBLICATIONS

Abstract; AN 89–060219 & SU,A, 1 417 211 (EMELY-ANOV) Database WPI, Section EI, Week 8908, Apr. 5, 1989; Derwent Publications Ltd., London, GB; Class W02; Aug. 15, 1988.

*Primary Examiner*—Sherrie Hsia
*Attorney, Agent, or Firm*—Venable; George Spencer; Robert Kinberg

[57] ABSTRACT

Apparatus for creating video test patterns for outputting to a video test pattern generator enables individual lines to be built from standard components with appropriate parameters. Completed lines are held in a form which is television standard-independent and can be edited numerically or graphically. A test pattern is built from a set of lines and a part or fully completed pattern can be displayed to an operator in a picture representation which simulates the appearance of the test pattern when displayed on a television receiver.

17 Claims, 4 Drawing Sheets a.

b.

c.

d.

e.

f.

APPARATUS FOR THE CREATION OF VIDEO TEST SIGNALS

BACKGROUND OF THE INVENTION

This invention relates to the creation and generation of video test signals.

It is essential in the design, testing, maintenance and calibration of high quality video equipment to have access to precise test signals. The nature of the test signals that are required will vary widely from application to application and, whilst a large number of standard test patterns are available, there is a continual need for fresh test patterns to be created for specific applications.

Historically, the more complex test patterns were created optically and scanned whenever a test signal was required. More recently, digital test pattern generators have become available, and the more useful of these are programmable. Test signals are then created and stored as digital data files. The test pattern generator stores one or more such files and converts any one of them into a video signal corresponding to a stationary video test pattern or signal. A particularly useful form of test pattern generator is disclosed in WO-A-93/20659.

Software systems have been devised to simplify the creation of test signal data files. Existing systems may permit the user to specify the signal level at various sample sites along the video line or may allow him to construct a video line from a number of basic signal components such as sine waves, cosine$^2$ pulses, colour bars and the like. Such systems may also allow the user to work at a terminal which displays a representation of the waveform enabling interactive amendment of the line signal. Once one or a number of line signals have been satisfactorily created, the corresponding data file is transferred to a test pattern generator and the test signal displayed on a video monitor. If the resulting test pattern is unsatisfactory, the data files can be re-loaded for editing in the software-driven creation system.

It will be recognised that the creation of a complex test pattern can be a time-consuming exercise even with the benefit of existing software tools.

SUMMARY OF THE INVENTION

It is one object of the present invention to provide improved apparatus for the creation of video test signals, which enables complex line-based test signals to be produced simply and quickly.

Accordingly, the present invention consists, in one aspect, in apparatus for the creation of video test signals, comprising means for generating line signals, store means for storing said line signals; waveform display means for displaying said line signals in waveform representation; and picture display means for selectively displaying one or more of said line signals in picture representation.

Since the present invention enables each line signal or group of line signals to be viewed directly in picture representation, it can be seen immediately whether the waveforms that have been created will result in the desired test pattern. It is not necessary each time to load the test signals into a test pattern generator and view the pattern on a video monitor.

Advantageously, editing means are provided for interactive editing of each line signal from one and preferably both of the waveform and picture displays.

In a preferred form of the invention, the line signals are created in a broadcast standard-independent representation, and convertor means are provided to convert said representation. Test signals can be provided in component or composite form; in PAL formats, NTSC, SECAM or indeed other formats; and optionally in analogue or digital form.

In a further aspect, the present invention consists in apparatus for the creation of video test patterns for outputting to a video test pattern generator or the like, comprising a pattern element store holding test pattern elements in a form which is television standard-independent; means for selecting a set of stored test pattern elements which together provide a selected test pattern; display means for displaying to an operator the selected test pattern; editing means for interactive editing of the displayed test pattern; pattern store means for storing one or more completed test patterns; and rendering means for converting a test pattern to a desired television standard.

The test pattern elements may be individual lines but could be other pattern elements.

In a number of important applications, it would be beneficial to have a test pattern which combined the accuracy of conventional test patterns with a degree of movement.

Thus, it is an object of a further form of this invention to provide a test pattern generator which is capable in a simple manner of providing a test pattern incorporating the appearance of movement, whilst not imposing excessive demands on memory.

Accordingly, the present invention consists in a further aspect in a test pattern generator comprising background image store means for storing a background image; foreground image store means for storing a foreground image; control means for selecting a series of display locations for the foreground image relative to the background image and means for generating a series of display frames comprising the foreground image superimposed upon the background image at successive ones respectively of said display locations.

Preferably, said control means is adapted to select display locations displaced one from the next by pixel displacements such as to simulate movement of the foreground image along a path relative to the background image.

Suitably, said path is continuous.

BRIEF DESCRIPTION OF DRAWINGS

The present invention will now be described by way of example with reference to the accompanying drawings in which.

DETAILED DESCRIPTION OF THE INVENTION

Figure 1:
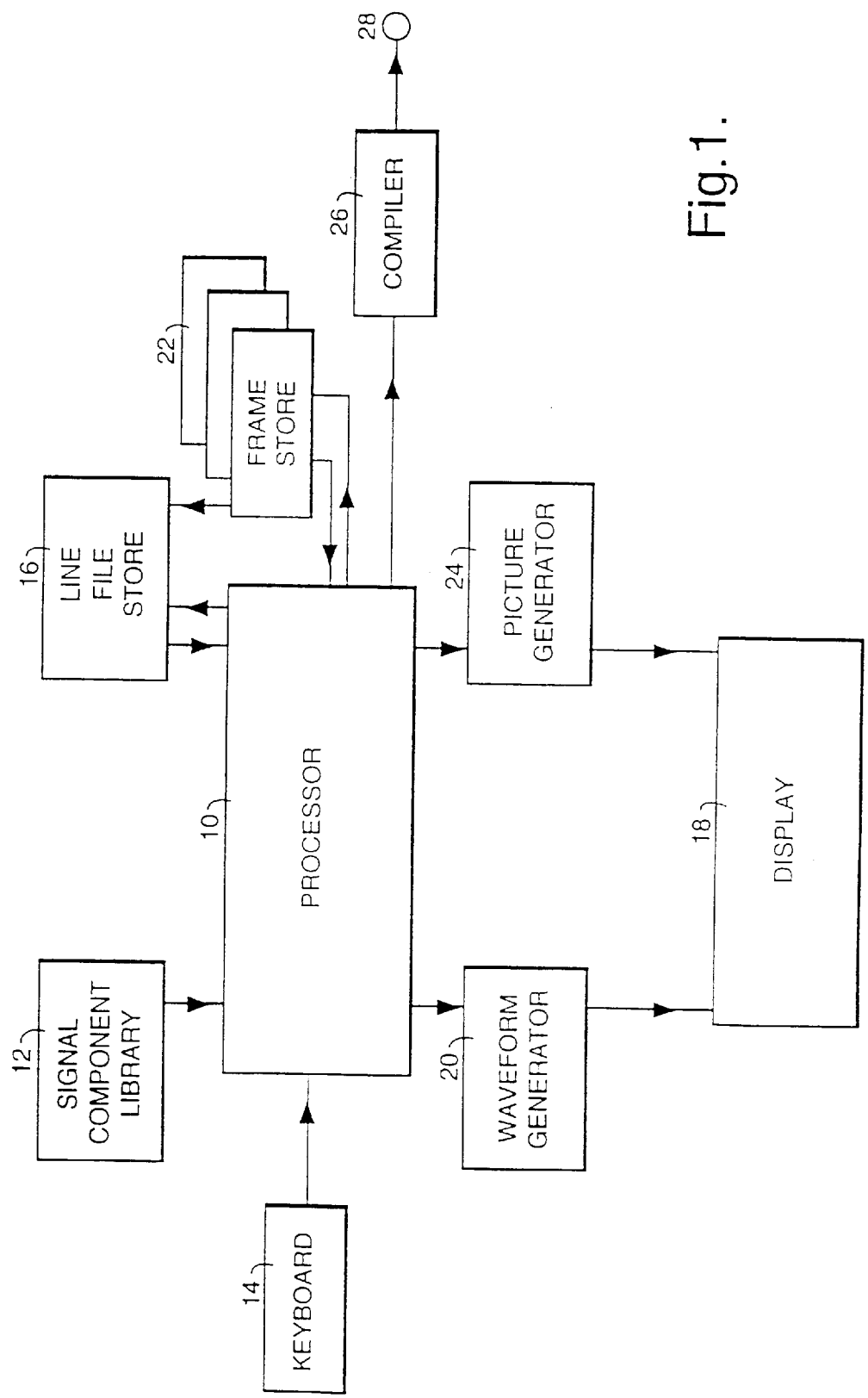
FIG. 1 is a block diagram illustrating apparatus according to the present invention for the creation of video test signals.

Referring first to FIG. 1, a processor (10) has access to a component library (12). This library holds a collection of basic signal components such as sine waves, cosine$^2$ pulses colour bars and the like. With the user interacting through keyboard (14), the processor serves the function of creating a video line file taking basic signal components from the component library (12) with appropriately chosen parameters such as amplitude, frequency, colour, time-constant and so on. Each completed line file is held in line file store (16). The processor is also able to take an existing line file from store (16) and through an editing operation create a new line file.

To facilitate the creation and editing of line files, the processor (10) communicates with a CRT or other display (18) through a wave form generator (20). This generator is adapted to convert a line file received from the processor (10) into a display file comprising a wave form representation of the video line. This enables the user, interactively, to monitor the voltage wave form of the line as parameters are changed or components added.

A frame is constructed as an address list of selected lines in the line field file store (16). The address list is held in frame store (22). As indicated symbolically in FIG. 1, the frame store (22) is capable of storing the address list for a current frame but also address lists for previously composed frames.

The processor (10) communicates with the display (18) additionally through a picture generator (24). This serves the purpose of converting a line file into a display file which comprises a picture representation (rather than a wave form representation) of the video line. Thus, the display file is such that what appears on the display, for each line file, is the visual analogue of what will appear on a television screen in response to the video line in question. Ordinarily, the picture generator (24) will receive a series of line files corresponding to the frame, or the partial frame which is under construction and which corresponds to the address list held in the current segment of store (22). Accordingly, the picture generator (24) will produce a series of display files, a number of which may be duplicates, which result in the display of a picture.

Processor (10) further communicates with a compiler (26). This serves the function of taking a succession of line files corresponding with the current address list in store (22)—or a previously created address list—and compiling a video test pattern signal for communication through port (28) with a test pattern generator.

Figure 2:
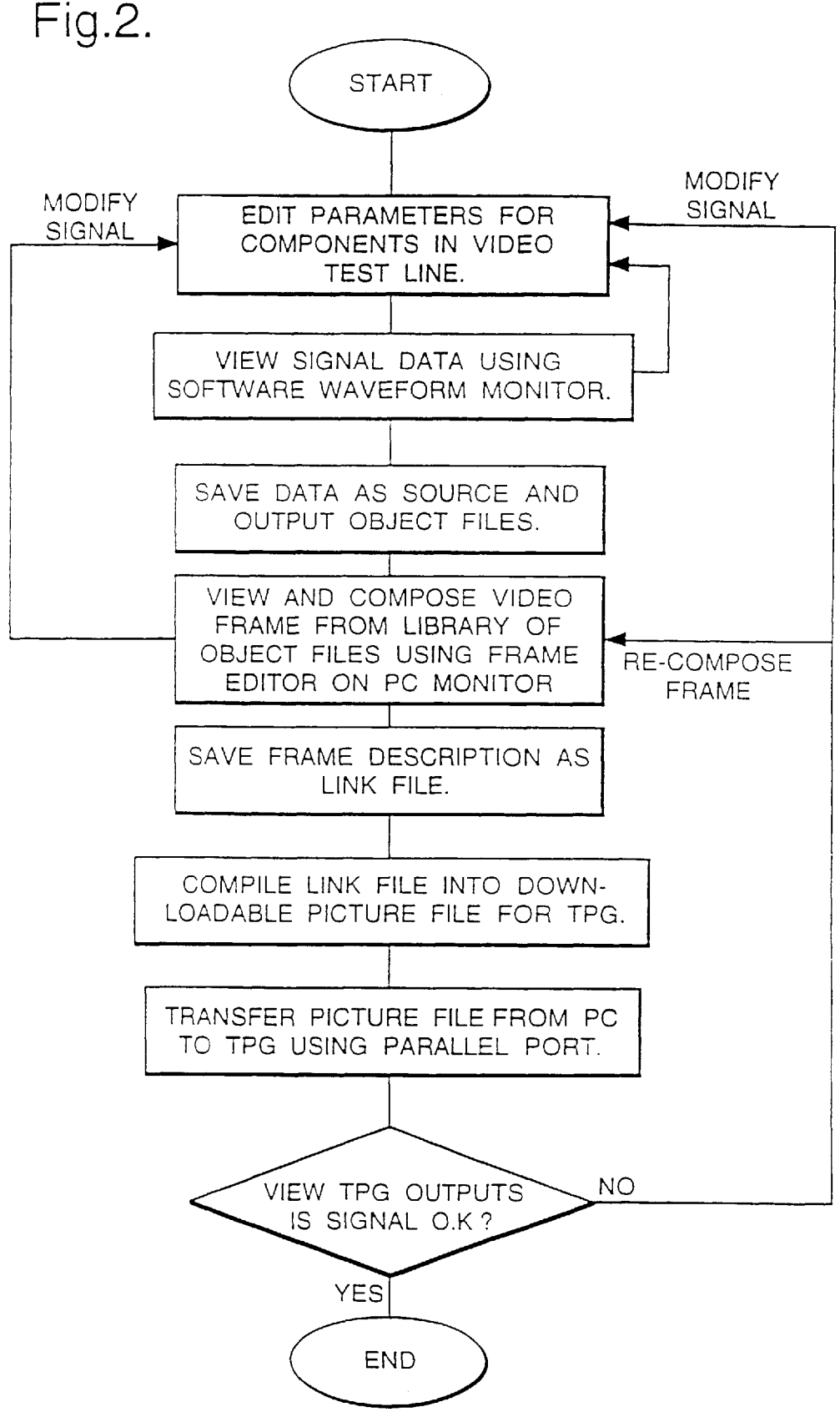
FIG. 2 is a diagram in flow chart form illustrating the operation of apparatus according to FIG. 1.

The operation of apparatus according to this aspect of the present invention can be further understood with reference to FIG. 2 which is in flow-chart form.

It will be observed that the initial step is to edit the selection and parameters of signal components to produce a video test line. This can be viewed in wave form representation and the editing process continued interactively. Once a satisfactory video test line has been achieved, data is saved as source and output object files. The source files contain "descriptions" about the components in a line and are not format-dependent. These include amplitudes, phases, positions and the like. Object files are pure binary files which are produced from the source files after sampling and filtering and are format-dependent. These files are stored in line file store (16).

Once a satisfactory library of line files has been created, it is possible to view and compose a video frame using the picture generator (24). This viewing procedure may indicate the need for modification of one or more line files in the line file store (16) or, indeed, the creation of new and different line files. On completion of a satisfactory frame, the frame description is saved in the form of a link file or address list in store (22). The subsequent procedure involves compiling the link file into the form of a down-loadable picture file which can be transferred to a test pattern generator using the parallel port (28).

Whilst the opportunity which the present invention provides of viewing a frame or a collection of lines in picture form, will considerably improve upon the "trial and error" of the prior art, there will still be circumstances in which the picture file down-loaded to the test pattern generator is not exactly in the desired form. FIG. 2 accordingly includes the additional procedure of viewing the test pattern on the test pattern generator and, if it is not satisfactory, recomposing the frame by choosing different line files or editing one or more of the line files comprised within the frame.

An alternative embodiment of the present invention, similar in approach but differing in detail from that described above, is shown in FIGS. 3 and 4.

Figure 3:
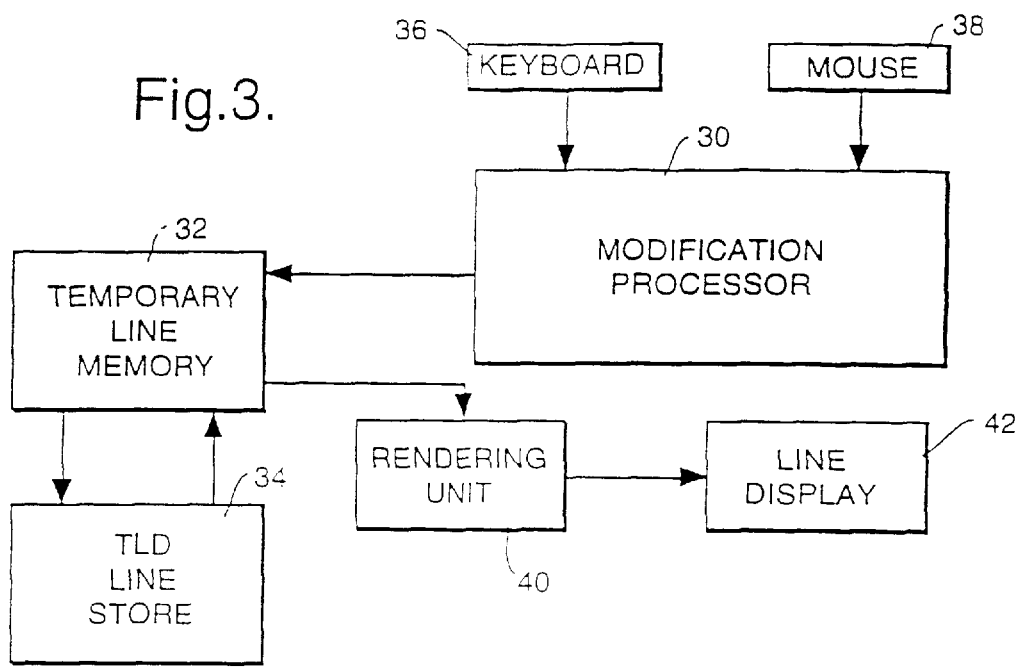
FIG. 3 is a diagram illustrating a process according to a further embodiment of the present invention showing the creation, editing, and display of line files.

Turning first to FIG. 3, a modification processor (30) utilises a temporary line memory (32) to build a test line description (TLD) file in a line store (34). The TLD file contains a list of signal components together with appropriate parameters such as amplitude, duration and frequency. It also has a header which includes format information, an indication of whether there are syncs and the number of components making up the line.

At the start of an edit procedure, a TLD file is loaded into the line memory (32) which provides temporary storage. In the case where a new line is to be created, a "null line" file is generated from a template. Under operator control, through a keyboard (36) and a mouse or other pointing device (38), the component list is modified. This can be achieved through a numerical (or absolute) editing procedure in which the parameters of a particular component are replaced by fresh numerical values or different components are selected. An alternative, graphical editing procedure is preferably also available. Under this graphical procedure, using a mouse or other pointing device, components can be moved, replicated, deleted or changed in visual form. For example, the visual form of a component can be "stretched" or "compressed" in time or in amplitude. A combination of such graphical and numerical procedures can provide extremely powerful line editing tools which are nonetheless easy to use and speedy.

The TDL file undergoes a rendering process in rendering unit (40) by which the file is first converted to a set of voltage level samples. These sample values are further processed to generate waveform display data or picture data in array form. These data arrays can be displayed on line display (42). The waveform display data array will be more frequently used in this line context but the ability to display a single line in picture form will be useful in certain situations.

Once the operator is satisfied with the line, the modification processor (30) replaces the original line file in store (34) with the contents of the temporary line memory (32).

Figure 4:
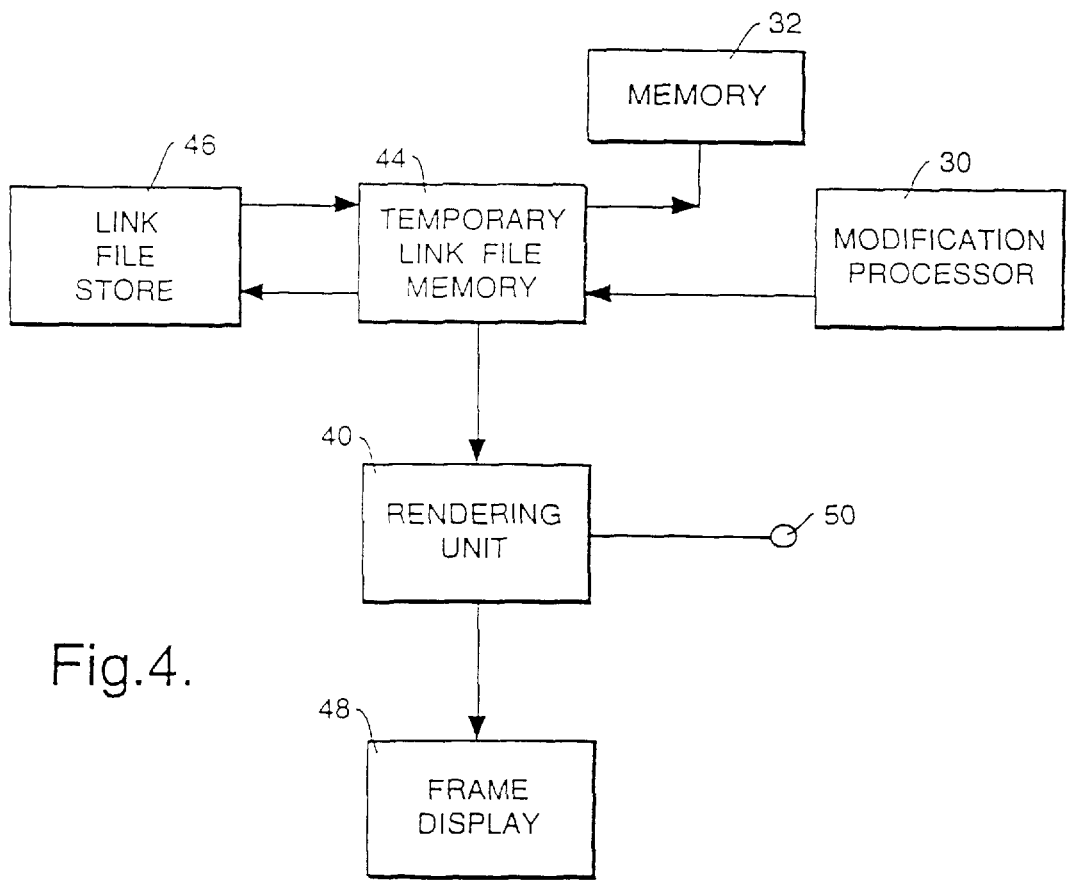
FIG. 4 is a diagram similar to FIG. 3, showing the creation, editing, and display of frames.

Turning now to FIG. 4, the modification processor (30) utilises a temporary link file memory (44) to build a link file in link file store (46). This link file comprises a set of line files (addressed by file name) and their positions in the frame. The modification processor reads a link file (LNK) from store (46) into the temporary memory (44). Under operator control, the identity and relative position of the lines can be modified. The TLD files identified by file name in the link file are converted by the rendering unit (40) into a video data array which can displayed in frame display (48) as a picture, that is to say in the form in which the pattern will eventually appear on a television screen. If the displayed picture for a frame (or part of a frame under construction) is not satisfactory, the link file can be modified to call up different lines or to change the position of lines already in the frame. Once the operator is satisfied with the displayed picture in the frame modification procedure, the contents of the temporary memory are added to the link file store (46).

To output a completed test pattern to the test pattern generator or other external device, the link file is loaded into memory (44) and the line files named in that link file are loaded into memory (32). The rendering unit (40) then provides the pattern in sampled voltage form at the selected standard to an output port (50).

The present invention encompasses the generation of two test pattern images or part-images which can be used in a test pattern generator according to the invention, to simulate a moving test image. This can be done, moreover, without sacrificing test pattern accuracy.

Figure 5:
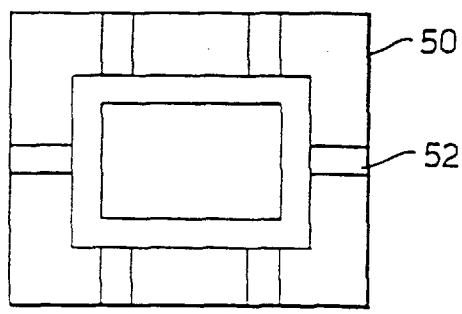
FIG. 5 is a series of diagrams illustrating the operation of a test pattern generator according to a further aspect of the present invention.
Figure 5:
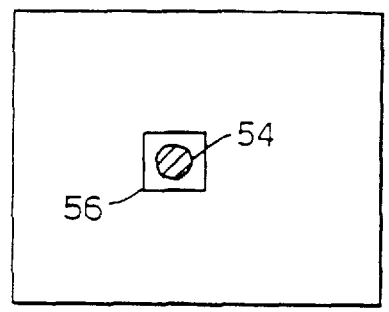
Figure 5:
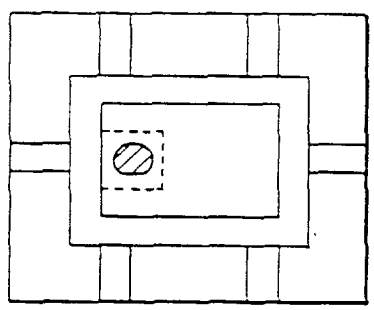
Figure 5:
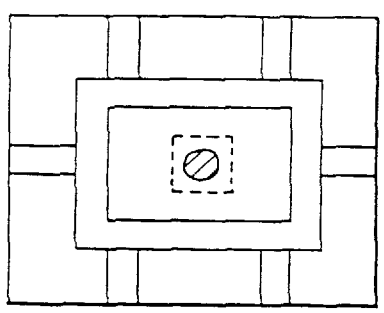
Figure 5:
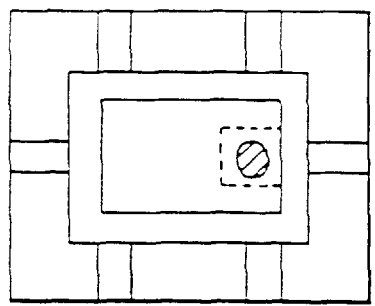
Figure 5:
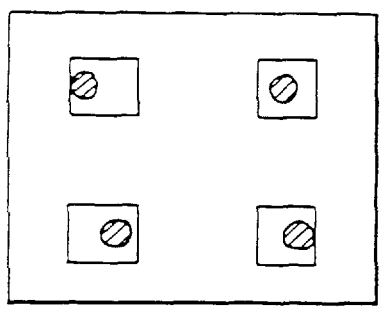

Referring to FIG. 5, diagrams 5A and 5B illustrate respectively the content of background and foreground stored test patterns or images. The background image shown schematically in FIG. 5A at (50) includes a defined region (52). The foreground image—as shown in FIG. 5B—has an image object (54) within a rectangular frame (56).

A succession of display frames are generated each comprising the foreground image object (54) superimposed upon the background image (50) at different locations within the defined region 52. This is illustrated in FIGS. 5C to 5E. Repetitive display of a number of these frames (three only being shown for the sake of clarity) will result in a test pattern sequence having the appearance of movement.

The manner in which the series of display locations of the foreground image relative to the background image are selected may be varied to create the desired visual effect. It will usually be appropriate to select display locations displaced one from the next by pixel displacements such as to simulate movement of the foreground image object along a path relative to the background image. That path might be vertical, horizontal or diagonal. The variation in pixel displacement might be linear or simulating simple harmonic motion. The displacements of the foreground image might be effected on a field-by-field basis; on a frame-by-frame basis to simulate a film look; or in a sequence of 3 field and 2 fields to simulate the results of 3:2 pull-down in NTSC telecine.

It will thus be recognised that with minimal storage requirements, a wide range of movement effects can be created.

In the case where the foreground image is small, the option may exist of storing a plurality of foreground images each representing the same foreground image object (54) at respective different locations within the frame (56). These locations will ordinarily differ in sub-pixel increments. AN example is shown schematically in FIG. 5F. It will then be possible not only to vary the pixel displacement of the foreground image, but also by selecting different ones of the foreground images in turn, to vary to sub-pixel accuracy the location of the foreground image object. This will be useful in particular applications demanding extremely smooth movement.

The manner in which the foreground image is superimposed upon the background image might involve direct substitution of the foreground pixel for the background pixel at the corresponding location. An alternative is to flag pixels in the foreground image, outside the foreground image object, as "transparent". Background image pixels which would otherwise be substituted by such "transparent" foreground pixels' will retain their original value. Still further variations will occur to those skilled in the art.

We claim:

1. Apparatus for the creation of a video test pattern under control of an operator, comprising means for generating video line signals through operator selection of line signal components and parameters therefor; store means for storing said line signals; display means capable of displaying data presented to the display means in a picture data file or a waveform data file; waveform display generator means for generating the waveform data file enabling the display means to display said line signals in waveform representation; and picture display generator means for selectively generating the picture data file enabling the display means to display one or more of said line signals in picture representation being the visual analogue of what would appear on a television screen in response, to said line signal or line signals.

2. Apparatus according to claim 1, wherein editing means are provided for interactive editing of each line signal.

3. Apparatus according to claim 2, wherein each line signal comprises a list of signal components, from a predetermined set of signal components, together with optional parameters for each component.

4. Apparatus according to claim 3, wherein the editing means comprises means for editing said list of components and said parameters.

5. Apparatus according to claim 1, wherein said means for generating line signals is adapted to generate lines in a broadcast standard-independent representation and wherein converter means are provided to convert said representation to a selected broadcast standard.

6. Apparatus according to claim 1, further comprising frame store means for storing a list of line signals selected from line signals stored in said store means.

7. Apparatus according to claim 6, wherein said picture display means serves to display simultaneously in picture representation, those line signals listed in the frame store means.

8. A test pattern generator comprising background image store means for storing a background image; foreground image store means for storing a foreground image; control means for selecting a series of display locations for the foreground image relative to the background image and means for generating from said background image store means and said foreground image store means, a series of display frames comprising the foreground image superimposed upon the background image at successive ones respectively of said display locations thereby to create for test purposes video pattern containing motion.

9. A test pattern generator comprising background image store means for storing a background image: foreground image store means for storing a foreground image; control means for selecting a series of display locations for the foreground image relative to the background image and means for generating from said background image store means and said foreground image store means, a series of display frames comprising the foreground image superimposed upon the background image at successive ones respectively of said display locations thereby to create for test purposes a video pattern containing motion, wherein said control means comprises a selector enabling operator selection between at least a video mode in which the display location changes between successive fields and a film mode in which said display location changes between successive frames.

10. A test pattern generator according to claim 9, wherein said control means enables operator selection of an NTSC telecine mode in which the display location changes at alternating intervals of three fields and two fields.

11. A test pattern generator comprising background image store means for storing a background image; foreground image store means for storing a foreground image; control means for selecting a series of display locations for the foreground image relative to the background image and means for generating from said background image store means and said foreground image store means, a series of display frames comprising the foreground image superimposed upon the background image at successive ones respectively of said display locations thereby to create for test purposes a video pattern containing motion, wherein said control means is adapted to select display locations displaced one from The next by pixel displacements such as to simulate movement of the foreground image along a path relative to the background image.

12. A test pattern generator according to claim 11, wherein said path is continuous.

13. A test pattern generator according to claim 8, wherein said foreground image store means is adapted to store a, plurality of foreground images comprising, respectively, an object with a displacement varying between the foreground images and wherein said means for generating a series of display frames operates to superimpose the foreground images sequentially at the respective locations.

14. A test pattern generator according to claim 13, wherein said displacements vary by sub pixel intervals.

15. Apparatus for the creation of video test patterns comprising a pattern element store holding test pattern elements in a form which is television standard-independent; means for selecting a set of the stored test pattern elements which together provide a selected test pattern; display means for displaying to an operator the selected test pattern; editing means for interactive editing of the displayed test pattern; pattern store means for storing one or more completed test patterns; and rendering means for converting a completed test pattern to a desired television standard.

16. Apparatus according to claim 15, wherein said test pattern elements comprise respective video lines.

17. Apparatus according to claim 16, wherein said rendering means is operative to convert individual lines to a desired television standard.

* * * * *